United States Patent [19]
Gerard

[11] 3,842,486
[45] Oct. 22, 1974

[54] METHOD OF INSTALLING ATTACHMENT FITTINGS IN CELLULAR MATERIAL
[75] Inventor: Milan E. Gerard, Chula Vista, Calif.
[73] Assignee: Rohr Industries, Inc., Chula Vista, Calif.
[22] Filed: Aug. 6, 1973
[21] Appl. No.: 386,068

[52] U.S. Cl.............. 29/481, 29/482, 29/494, 29/502
[51] Int. Cl............................................ B23k 31/02
[58] Field of Search ............ 29/481, 482, 488, 494, 29/502, 484, 157.3 A, 157.3 R

[56] References Cited
UNITED STATES PATENTS
2,701,411  2/1955  Paine .............................. 29/481 X
3,024,879  3/1962  Kandra ........................... 29/482 X
3,180,022  4/1965  Briggs et al. .................... 29/502 X
3,591,922  7/1971  Pardee et al. ................... 29/502 X Primary Examiner—C. W. Lanham
Assistant Examiner—Victor A. Di Palma
Attorney, Agent, or Firm—Jay D. Gordon

[57] ABSTRACT

A method of installing attachment fittings in cellular material such as a honeycomb sandwich. A hole is formed in the sandwich extending through the skins as well as the cellular material. The hole is drilled and reamed and purged with an inert gas such argon. A coated attachment fitting is inserted into the hole the ends of which protrude beyond the faces of the sandwich. Electrodes are applied to the fitting which heats the coating to melt upon which is formed fillets with the skins of the sandwich so as to anchor the fitting therein. The electrodes are removed and then the fitting is shaved flush with the skins of the sandwich.

10 Claims, 5 Drawing Figures

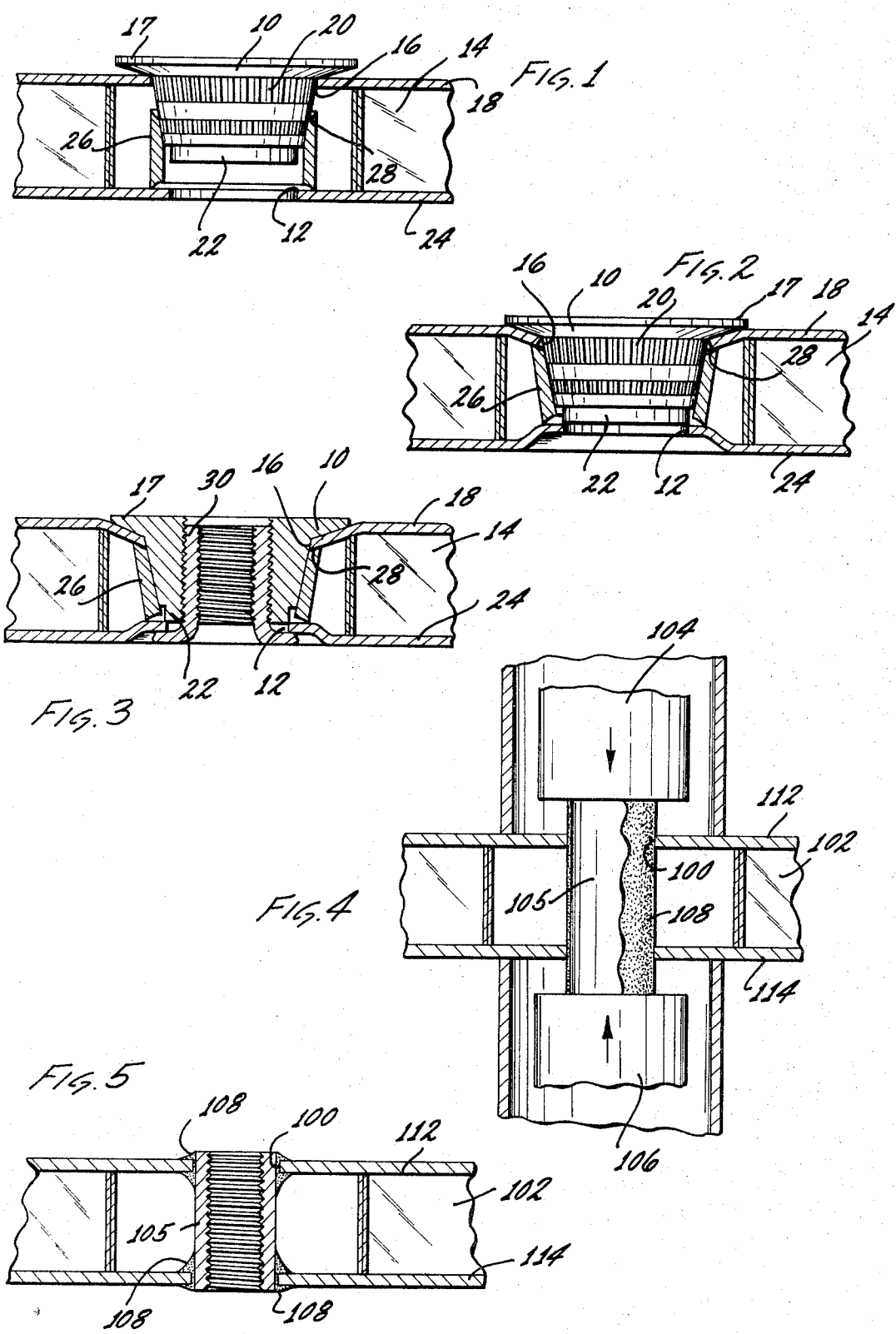

METHOD OF INSTALLING ATTACHMENT FITTINGS IN CELLULAR MATERIAL

BACKGROUND OF THE INVENTION

The present invention relates to a method of installing attachment fittings in cellular material.

Cellular structural materials, notably the honeycomb sandwich variety, are used in great quantities in aircraft. The high strength - weight ratio that is characteristic of this material has expanded its use to major structural areas of the aircraft. Such use requires a variety of aircraft components be joined to the honeycomb material. This has proven in the past to be a rather difficult problem since the cellular honeycomb is generally not supportive of conventional joining techniques. A small section of the honeycomb has very little independent strength of its own and unless potted or filled with a rather rigid material, it will generally not support any insert or other components to be attached thereto.

Because of the peculiar nature of the honeycomb sandwich, some rather involved methods have been developed which produce structurally secure joinings of inserts or attachments fittings to the honeycomb sandwich. These methods have proved to be inadequate for several reasons. Firstly, they require multiple steps to produce a structurally dependable joinder. Secondly, the attachment of these fittings in a conventional manner always produces a certain amount of deformation of the honeycomb material. Obviously when dealing with modern aircraft, any deformation at all is to be avoided.

One such method calls for the implantation into the honeycomb material of a fitting commonly known as trade as a Delron. This installation calls for multiple steps and requires the use of specialized tools. For instance the sandwich is counterbored to receive the widened section of the Delron. To insure positionally correct joinder of the Delron, honeycomb core in the vicinity of the hole must be removed by an appropriate process. The interior of the faces of the honeycomb material must be deburred, a procedure that is generally manually executed. To insure the joinder is entirely impervious, primer coat is applied around the hole and allowed to dry in air. Yet another primer coat is applied to the Delron which is also allowed to air dry. It is then necessary to apply sealent around the hole, which is now ready for the reception therein of the Delron. To insert the Delron, an appropriate mandrel is first received in the hole and the Delron is then loaded or threaded onto the mandrel, which is maintained in position by a nut fastened on the other end of the mandrel. The mandrel is then pulled to preset stop position which action anchors or implants delron in the honeycomb material while at the same time dimpling or depressing the outer skin of the honeycomb material sandwich. At this point the mandrel is removed and then inserted through the hole in the opposite direction. Now a flaring tool is threaded on the mandrel which curls the lower end of the Delron about the contiguous bottom skin. It is then necessary to reapply primer around the flared Delron, air dry and then once again apply the sealent. Finally, what is known as a Keensert is threaded into the Delron and locked in place.

As previously stated, this method requires a large number of steps including the use of specialized tools and one of its by products is deformation of the honeycomb material sandwich. It should be evident that such deformation, if possible, is to be avoided. The present invention not only eliminates such deformation, but does so with a method considerably simpler than that previously described and comprises fewer steps and requires no specialized tools. Substantial savings are involved in both the cost of materials the tools as well as labor.

SUMMARY OF THE INVENTION

The present invention calls for the use of a cylindrical fitting or sleeve coated on its exterior with a copper-nickel alloy, and which includes an internal thread. A hole is drilled through the honeycomb sandwich and the fitting is received therein. Initially the fitting extends beyond the skins of the honeycomb sandwich and the electrodes are applied to the respective ends of the fitting. The fitting is now heated to a temperature in the vicinity of 1,500° F so as to melt the coating which flows to form fillets with the exterior and interior of the skins of the honeycomb sandwich. The heating is done in an atmosphere of inert gas such as argon. After the fillets are formed, the electrodes are removed and the fitting is permitted to cool. The end of the fittings are now shaved fulsh with the skins and the fitting is now ready for components to be attached thereto.

The above and other aspects of the present invention will be evident as the description continues and when read in conjunction with the appended drawings.

BRIEF DESCRIPTION OF THE DRAWINGS

FIG. 1, is a partially cross-sectioned view of a Delron loaded in a hole in the honeycomb sandwich;

FIG. 2, is a partially cross-sectioned view illustrating implantation of the Delron and the honeycomb material sandwich;

FIG. 3, is a cross sectional view illustrating the bottom of the Delron curled about the lower skin of the honeycomb material and the Keensert being received within the Delron;

FIG. 4, illustrates the instant invention, partially in cross section, wherein the fitting is received within the hole and electrodes are applied to the fittings prior to melting the coating;

FIG. 5, illustrates in cross section, the fitting of the instant invention shown implanted in the honeycomb sandwich and the ends of the fitting being relatively flush with the skins.

DESCRIPTION OF PREFERRED EMBODIMENT

In FIG. 1, a fitting, 10, commonly referred to in the aircraft industry as a Delron, is shown loaded in hole 12 formed in the honeycomb sandwich 14. The hole 12 includes the counterbored portion 16 formed in the top skin 18. The Delron 10 is knurled or serrated along the exterior of its upper conical portion 20. The uppermost portion of the Delron 10 is in the nature of a circular flange 17 which upon complete installation becomes seated in the upper skin 18 of the sandwich 14. The lower portion of the Delron composes a rim 22 which upon full installation is flared so as to grasp the lower skin 24. A sleeve 26 is slidably received about the body of the Delron 10, which sleeve is subsequently deformed and abuts the interior of the interior of both skins 18, 24.

After the Delron 10 is loaded onto a mandrel (not shown) it is implanted into the sandwich 14. This step is preceded by the steps of core removal, deburring, priming and sealing all of which have been described in another section of this specification. To perform the necessary pulling of the Delron 10 into the sandwich 14, a fastener (not shown) is received on the mandrel the function of which is to push the Delron 10 into the sandwich 14. At the same time a tool on the mandrel is active to shove the sleeve 26 upwardly, which sleeve deforms into a conical shape and which is generally contiguous the exterior walls of the Delron 10. As shown in FIG. 2, this step also causes a dimpling or depressing of the upper and lower skins 18, 24. The skins 18, 24 dimple just enough so that they are in contact with the ends of the sleeve 26 which abuts the interior of those skins. To insure abutment of the skin, the sleeve 26 is countersunk 28 along its upper edge.

Hole 12 is dimensioned slightly larger then the rim 22 so that rim 22 can protrude therethrough. The mandrel is now removed and inserted into hole 12 through the Delron 10 in the opposite direction and a flaring tool (not shown) is loaded thereon. This tool serves to flare the rim 22 about the adjacent skin 24 and effectively lock the Delron within the confines of the honeycomb sandwich 14. After this is done, a threaded fitting, called a Keensert 30, is inserted within the Delron 10. It is to that Keensert that the various components are attached and the involved steps to implant the Delron 10 are all preparatory to the primary goal of securing that Keensert.

The instant invention, as illustrated in FIGS. 4 and 5 is vastly simpler to that described in connection with the Delron 10. In FIG. 4 there is shown a hole 100 formed (via drilling and reaming) in the honeycomb sandwich 102. Received in the hole is a coated fitting 105, the coating of which comprises an appropriate alloy of copper and nickel. Electrodes 104, 106 are applied to the respective ends of the fitting 105 and current is passes through the fitting until the temperature of about 1500° F is reached. At this temperature, the coating melts and forms circular fillets 108 between the fitting 105 and the interior and exterior of the upper and lower skins 112, 114. It is to be indicated that the heating takes place in a purged atmosphere such as an argon environment. Once the fitting 105 has cooled, the ends thereof are shaved, by any appropriate method, so that they are approximately flush with skins 112, 114.

The method described above is significantly superior to the prior art. A superior joinder between the fitting and the honeycomb sandwich is established: There is no deformation of the honeycomb sandwich, and the joinder is impervious to fluids. This superior joint is the end product of an extremely simple, efficient and inexpensive method. Fittings can be implanted much faster then in the prior art since many steps are eliminated.

Many changes may be made in the details of the instant invention, in the method and material of fabrication, in the configuration assemblage of the constituent elements, without departing from the spirit and scope of the appended claims, which changes are intended to be embraced therewithin.

I claim:

1. A method of installing attachment fittings in a cellular material sandwich which comprises: forming a hole in said material to receive said attachment fitting; placing a fitting into said hole, said fitting having an outside diameter corresponding to the diameter of said hole, and said fitting being coated on its exterior surface with a thermoplastic material; and melting said coat to form fillets which connect said fitting to said cellular material sandwich.

2. In the method of claim 1 said hole is drilled.

3. In the method of claim 2 reaming said hole.

4. In the method of claim 1 purging said hole prior to placing the fitting therein.

5. The method of claim 1 including the step of applying electrodes to said fitting, heating said coating to melt, and then cooling said fitting.

6. The method of claim 1 which comprises shaving the ends of the fitting flush with the skin of said cellular material.

7. The method of claim 1 which in the step of forming said hole in said cellular material comprises the steps of drilling and reaming; purging said hole prior to placing the insert therein, applying electrodes to said fitting and heating said coating to melt, cooling said fitting, and shaving the ends of said fitting flush with the skin of said cellular material.

8. A method of installing attachment fittings in a faced, honeycomb cellular material sandwich comprising the steps of forming a hole through said sandwich to receive said fitting, placing a fitting in said hole, said fitting having an outside diameter corresponding to the diameter of said hole, and said fitting being coated on its exterior surface with a thermoplastic material, the ends of said fitting protrude beyond the skin of said sandwich, melting said coating to form fillets with said honeycomb material which connects said fitting with said sandwich.

9. The method of claim 8 including the step of shaving the ends of said fitting flush with the skin of said sandwich.

10. The method of claim 8 including the steps of purging said hole with inert gas prior to placing said fitting therein, applying electrodes to the ends of said fitting and heating said coating to melt.

* * * * *